United States Patent [19]
Kishi et al.

[11] Patent Number: 5,327,057
[45] Date of Patent: Jul. 5, 1994

[54] METHOD OF GENERATING ROBOT CONTROL AXIS POSITION DATA

[75] Inventors: Hajimu Kishi; Kunio Tanaka; Shinsuke Sakakibara, all of Tokyo, Japan

[73] Assignee: Fanuc Ltd., Minamitsuru, Japan

[21] Appl. No.: 6,149

[22] PCT Filed: Oct. 18, 1985

[86] PCT No.: PCT/JP85/00585

§ 371 Date: Jun. 16, 1986

§ 102(e) Date: Jun. 16, 1986

[87] PCT Pub. No.: WO86/02469

PCT Pub. Date: Apr. 24, 1986

Related U.S. Application Data

[63] Continuation of Ser. No. 881,033, Jun. 16, 1986, abandoned.

[30] Foreign Application Priority Data

Oct. 19, 1984 [JP] Japan ................. 59-220081

[51] Int. Cl.[5] ........................................... G05B 19/19
[52] U.S. Cl. ................... 318/568.11; 318/568.19; 318/561; 318/567; 395/86; 395/88
[58] Field of Search ............... 318/560, 561, 563, 565, 318/567, 570–574, 576, 568.1, 568.11, 568.15, 568.16, 568.18, 569.19, 568.21, 568.22, 569, 600, 626, 651, 671; 395/80, 85–86, 88, 97

[56] References Cited

U.S. PATENT DOCUMENTS

| | | | |
|---|---|---|---|
| 4,429,266 | 1/1984 | Tradt ........................... | 318/568 D |
| 4,491,906 | 1/1985 | Kishi et al. .................. | 364/191 |
| 4,497,029 | 12/1985 | Kiyokawa ................... | 318/572 |
| 4,558,977 | 12/1985 | Inoue et al. ................. | 318/572 |
| 4,572,998 | 2/1986 | Nozawa et al. ............. | 318/572 |

FOREIGN PATENT DOCUMENTS 124357 of 1975 Japan.

*Primary Examiner*—William M. Shoop, Jr.
*Assistant Examiner*—David Martin
*Attorney, Agent, or Firm*—Staas & Halsey

[57] ABSTRACT

The present invention relates to a method of generating data indicative of robot control axis position. The method has a step of inputting data specifying the shape of a workpiece (WK) and data ($\alpha$, $\beta$, $\gamma$) specifying the attitude of a tool (TL) conforming to a task to be executed by a robot, a step of calculating a position (X, Y, Z) of a tip (P) of the tool in the workpiece coordinate system X-Y-Z by using the data specifying the workpiece shape, a step of specifying the position of each axis constituting the robot by using the tool tip position and the tool attitude data, and a step of successively specifying positions of each control axis of the robot along a tool path (PT).

4 Claims, 6 Drawing Sheets

FIG. 8(A)

| INITIAL STATE IN PART COORDINATE SYSTEM ($\alpha=\beta=\gamma=0$) | INITIAL STATE IN HVS COORDINATE SYSTEM ($\alpha=\beta=\gamma=0$) | INITIAL VALUES IN HVS COORDINATE SYSTEM ($\alpha=\beta=\gamma=0$) | CASE |
|---|---|---|---|
| Z(0.0.1), X(1.0.0), Y(0.1.0) | S(0.0.1), V(-1.0.0), H(0.1.0) | $\begin{matrix} H \\ V \\ S \end{matrix} \begin{pmatrix} 0 & 1 & 0 \\ -1 & 0 & 0 \\ 0 & 0 & 1 \end{pmatrix}$ | 1 |
| Z(0.0.1), X(1.0.0), Y(0.1.0) | S(0.0.1), H(1.0.0), V(0.1.0) | $\begin{matrix} H \\ V \\ S \end{matrix} \begin{pmatrix} 1 & 0 & 0 \\ 0 & 1 & 0 \\ 0 & 0 & 1 \end{pmatrix}$ | 2 |
| Z(0.0.1), X(1.0.0), Y(0.1.0) | V(0.-1.0), H(0.0.1), S(1.0.0) | $\begin{matrix} H \\ V \\ S \end{matrix} \begin{pmatrix} 0 & 0 & 1 \\ 0 & -1 & 0 \\ 1 & 0 & 0 \end{pmatrix}$ | 3 |
| Z(0.0.1), X(1.0.0), Y(0.1.0) | V(0.0.1), S(1.0.0), H(0.1.0) | $\begin{matrix} H \\ V \\ S \end{matrix} \begin{pmatrix} 0 & 1 & 0 \\ 0 & 0 & 1 \\ 1 & 0 & 0 \end{pmatrix}$ | 4 |
| Z(0.0.1), X(1.0.0), Y(0.1.0) | H(1.0.0), S(0.1.0), V(0,0,-1) | $\begin{matrix} H \\ V \\ S \end{matrix} \begin{pmatrix} 1 & 0 & 0 \\ 0 & 0 & -1 \\ 0 & 1 & 0 \end{pmatrix}$ | 5 |
| Z(0.0.1), X(1.0.0), Y(0.1.0) | H(0.0.1), V(1.0.0), S(0.1.0) | $\begin{matrix} H \\ V \\ S \end{matrix} \begin{pmatrix} 0 & 0 & 1 \\ 1 & 0 & 0 \\ 0 & 1 & 0 \end{pmatrix}$ | 6 |

FIG. 8(B)

| INITIAL STATE IN PART COORDINATE SYSTEM ($\alpha=\beta=\gamma=0$) | INITIAL STATE IN HVS COORDINATE SYSTEM ($\alpha=\beta=\gamma=0$) | INITIAL VALUES IN HVS COORDINATE SYSTEM ($\alpha=\beta=\gamma=0$) | CASE |
|---|---|---|---|
| 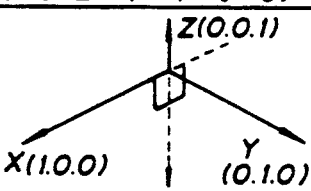 | 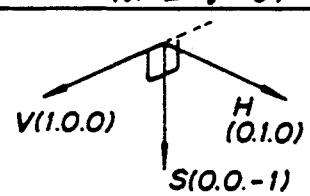 | $\begin{pmatrix} H \\ V \\ S \end{pmatrix} \begin{pmatrix} 0 & 1 & 0 \\ 1 & 0 & 0 \\ 0 & 0 & -1 \end{pmatrix}$ | 7 |
| 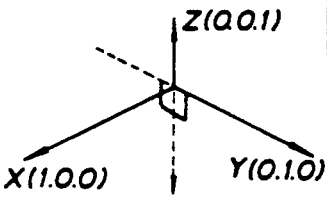 | 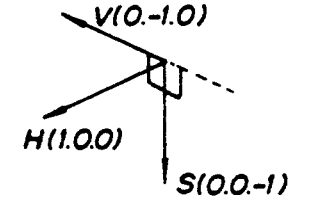 | $\begin{pmatrix} H \\ V \\ S \end{pmatrix} \begin{pmatrix} 1 & 0 & 0 \\ 0 & -1 & 0 \\ 0 & 0 & -1 \end{pmatrix}$ | 8 |
| 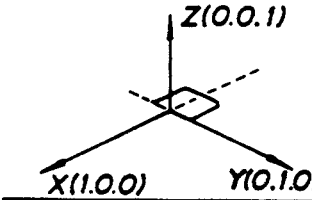 | 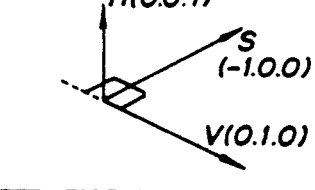 | $\begin{pmatrix} H \\ V \\ S \end{pmatrix} \begin{pmatrix} 0 & 0 & 1 \\ 0 & 1 & 0 \\ -1 & 0 & 0 \end{pmatrix}$ | 9 |
| 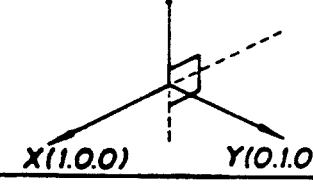 | 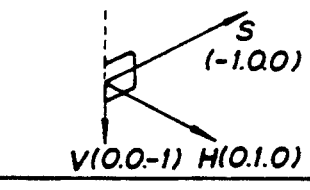 | $\begin{pmatrix} H \\ V \\ S \end{pmatrix} \begin{pmatrix} 0 & 1 & 0 \\ 0 & 0 & -1 \\ -1 & 0 & 0 \end{pmatrix}$ | 10 |
| 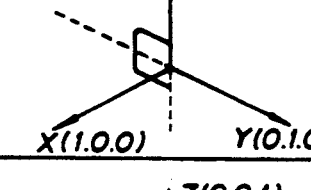 | 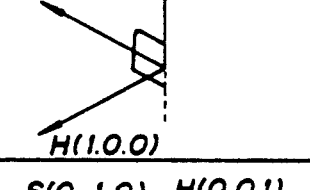 | $\begin{pmatrix} H \\ V \\ S \end{pmatrix} \begin{pmatrix} 1 & 0 & 0 \\ 0 & 0 & 1 \\ 0 & -1 & 0 \end{pmatrix}$ | 11 |
| 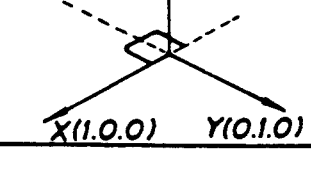 | 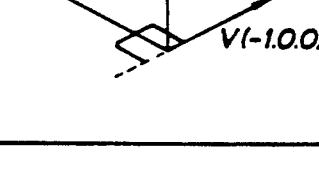 | $\begin{pmatrix} H \\ V \\ S \end{pmatrix} \begin{pmatrix} 0 & 0 & 1 \\ -1 & 0 & 0 \\ 0 & -1 & 0 \end{pmatrix}$ | 12 |

METHOD OF GENERATING ROBOT CONTROL AXIS POSITION DATA

This application is a continuation of application No. 06/881,033, filed Jun. 16, 1986, now abandoned.

DESCRIPTION

Technical Field

This invention relates to a method of generating data indicative of robot control axis positions. More particularly, the invention relates to a robot control axis position data generating method through which universal robot control axis position data of the same format can be generated offline irrespective of the type of robot (cylindrical coordinate system robots, articulated robots, Cartesian coordinate system robots and other robots having different control axis configurations).

Background Art

A robot has its position controlled on the basis of robot control data created in advance and stored in memory and performs tasks at predetermined positions, such tasks including loading and unloading the workpiece of a machine tool or the like, attaching and detaching tools to and from the machine tool, and subjecting workpieces to painting, welding and sealing. Hereafter, an effector such as the robot hand, a welding torch or a paint spraying nozzle attached to the robot shall be referred to generically as a "tool".

Conventionally, the positions of the control axes constituting a robot or path data are created by a teaching operation in which the tool is moved manually along a desired path, and the data are stored in a robot control unit memory. When an actual task is performed, path control is executed using the position or path data created by the teaching operation and the tool is moved along the desired path or positioned at desired points to performed the predetermined task.

However, creating the position data and path data by teaching is troublesome and time-consuming, and the teaching operation is hazardous. Moreover, highly precise teaching of positions and paths cannot be performed, thus making it impossible to achieve highly precise painting, welding and sealing.

Accordingly, an object of the present invention is to provide a robot control axis position data generating method through which data indicative of robot control axis positions can be created simply and offline without teaching.

Another object of the present invention is to provide a robot control axis position data generating method through which data indicative of robot control axis positions can be created offline in the same format for robots of all kinds.

Still another object of the present invention is to provide a robot control axis position data generating method for specifying robot control axis positions in terms of the task the robot executes and tool attitude data determined by the tool shape, in addition to the tool tip position obtained from data specifying the shape of the workpiece.

A further object of the present invention is to provide a robot control axis position data generating method for creating data specifying robot control axis positions in the same format for robots of all kinds, subjecting these data to a coordinate transformation in dependence upon the robot being controlled, and controlling the position of each axis of the robot on the basis of the control axis position data obtained by the coordinate transformation.

According to the present invention, these objects are attained by inputting data specifying the shape of a workpiece and data specifying the attitude of a tool conforming to the task to be executed by a robot, calculating the position of the tool tip in the workpiece coordinate system by using the data specifying the workpiece shape, and specifying the position of each control axis of the robot along a tool path by using the tool tip position and the tool attitude data.

DISCLOSURE OF THE INVENTION

The method of the invention includes inputting data specifying the shape of a workpiece and data specifying the attitude of a tool conforming to the task to be executed by a robot, calculating the position (X, Y, Z) of the tool tip in the workpiece coordinate system by using the data specifying the workpiece shape, obtaining the position of each control axis constituting the robot by using the tool tip position and the tool attitude data, and successively obtaining positions of each control axis of the robot along a tool path. Further steps include inputting data specifying the shape of the workpiece and data specifying the tool path, and successively obtaining positions of each control axis of the robot along the tool path specified by the tool path data. The data specifying the tool attitude include angles $\alpha$, $\beta$ which indicate deviations of a tool central axis from the direction of a workpiece normal line at the tool tip position, and a twist angle $\gamma$ indicating an amount of tool tip twist.

Each control axis position is obtained by converting the tool attitude data into tool direction data (P, Q, R) in the workpiece coordinate system, and converting (X, Y, Z, P, Q, R) comprising the tool direction data and data specifying the tool tip position (X, Y, Z) into position data in the robot coordinate system on the basis of the type of robot used (cylindrical coordinate system robot, articulated robot, Cartesian coordinate system robot, etc.) and data specifying the dimensions of the robot.

BRIEF DESCRIPTION OF THE DRAWINGS

FIGS. 2 through 4 are views for describing the relationship between constraints $\alpha$, $\beta$, $\gamma$ and a robot task, in which FIG. 2 is a view for describing the constraints in a painting operation, FIG. 3 is a view for describing the constraints in arc welding and sealing operations.

FIGS. 6, 7, 8(a), 8(b) and 9 are views for describing a method of obtaining P, Q, R by using the constraints ($\alpha$, $\beta$, $\gamma$);

BEST MODE FOR CARRYING OUT THE INVENTION

Figure 1:
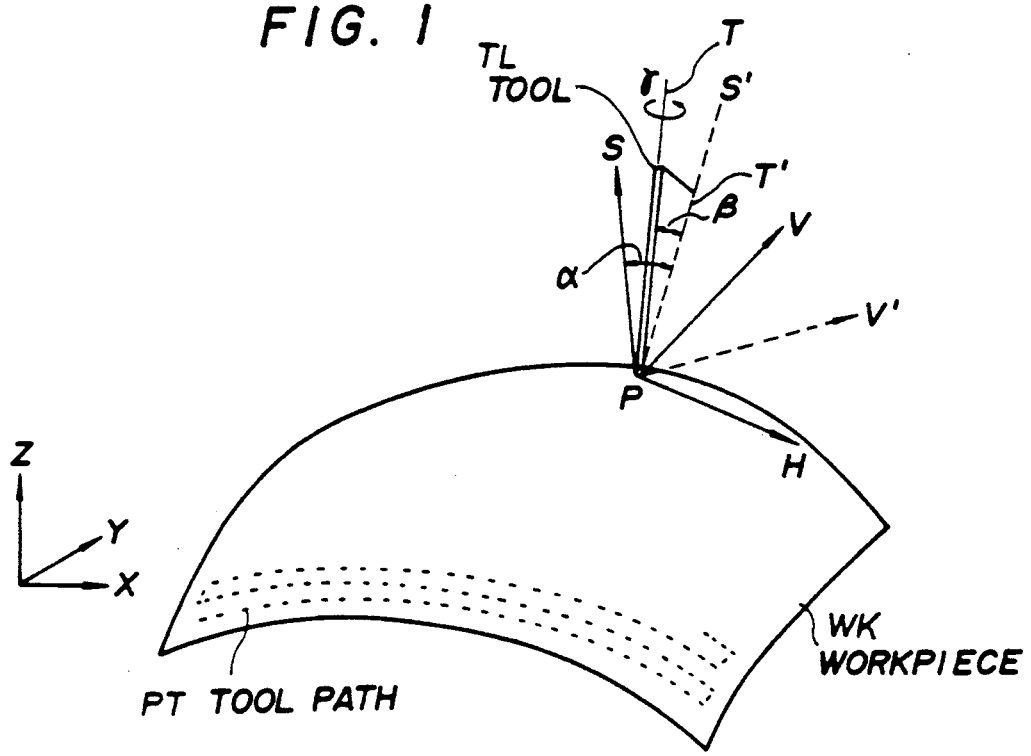
FIG. 1 is a view for describing the general features of the present invention.

FIG. 1 is a view for describing the general features of the present invention. TL represents a tool, and WK denotes a workpiece having a freely curved surface. To specify the freely curved surface of the workpiece, by way of example, data are given specifying several sections and section curves of the workpiece WK, a plurality of intermediate sections are generated in accordance with predetermined rules by using the section data and section curve data, and section curves (intermediate section curves) of the workpiece are obtained based on the intermediate sections. The freely curved surface of the workpiece is specified by a plurality of the generated intermediate section curves. For the details of this curved surface generating method, refer to the specification of Japanese Patent Application No. 55-78247 (U.S. Pat. No. 4,491,906).

Returning to FIG. 1, let a point P (the position of the tool tip) on a freely curved surface represent the origin, and let an S axis represent the direction of a normal line to the workpiece at the origin P, an H axis the direction along which the tool advances, and a V axis a third axis of a right-hand coordinate system in which the other two axes are so decided as to coincide with the S and H axes, respectively. Under these conditions, the position of each control axis of a robot in the workpiece coordinate system is specified by the position X, Y, Z of the origin P (namely the position of tip of the tool TL) in a Cartesian coordinate system (the workpiece coordinate system), angles of deviation $\alpha$, $\beta$ of the tool central axis T from the normal vector S, and a twist angle (angle of rotation) $\gamma$ of the tool TL.

It should be noted that $\alpha$, $\beta$ and $\gamma$ are attitude data specifying the attitude of the tool. These data are defined as follows:

$\alpha$ is an angle formed in the SV plane by an axis T' (dashed line), which is obtained by projecting the tool central axis T onto the VS plane, and the S axis. Accordingly, the S axis is superimposed on the axis T' when rotated $\alpha°$ about the H axis.

$\beta$ is an angle formed by an S' axis and the tool central axis T in an S'H plane, where S'V' is a new plane obtained by rotating the VS plane about the H axis until the S axis is superimposed on the axis T'. In other words, the S' axis is superimposed on the tool central axis T when rotated $\beta°$ about the V' axis.

$\gamma$ is a tool twist angle about an S" axis (tool central axis), where S"H' is a new plane obtained by rotating the S'H plane about the V' axis until the S' axis is superimposed on the tool central axis T. The counter-clockwise direction is taken as being positive for this angle.

The final attitude of the tool cannot be determined even when the coordinate values (X, Y, Z) of the tool tip P on the workpiece and the workpiece normal vector S at this position are given. The reason is that, depending upon the robot task, it is necessary to perform the task with the tool central axis T tilted from the normal vector S in the direction of advance, or with the tool tip pointed toward the workpiece at a fixed attitude at all times. Therefore, according to the present invention, the three elements (constraints) $\alpha$, $\beta$, $\gamma$ that determine the tool attitude are introduced, as set forth above. All tool states can be specified in terms of the three constraints ($\alpha$, $\beta$, $\gamma$) and the coordinate values (X, Y, Z) of the tool tip position. Accordingly, if X, Y, Z, $\alpha$, $\beta$ and $\gamma$ are subjected to predetermined processing conforming to the robot used, position data for each control axis constituting the robot can be obtained. If each control axis is driven based on the position data obtained by the above processing, the tool tip will arrive at the positions designated by the coordinate values (X, Y, Z), the tool central axis will be displaced from the normal vector by $\alpha$ and $\beta$, and the tool tip will assume the state which results by being twisted by $\gamma$. In other words, X, Y, Z, $\alpha$, $\beta$ and $\gamma$ are converted into the robot control axis position data by executing the predetermined processing in dependence upon the robot used and, hence, these are universal data good for all robots.

The coordinate values (X, Y, Z) of the origin P in the workpiece coordinate system are obtained based on the above-described curved surface generating method using data specifying the shape of the workpiece.

The constraints $\alpha$, $\beta$, $\gamma$ are determined based on the activity (painting, arc welding, spot welding, sealing, etc.) executed by the robot and the shape of the workpiece, as will be described below.

Accordingly, if discrete tool tip positions (positions indicated by the dots in FIG. 1) on the workpiece along the tool path PT are successively generated, then universal robot control axis position data will be generated based on the tool tip position (X, Y, Z) and the separately given constraints $\alpha$, $\beta$, $\gamma$.

Figure 2:
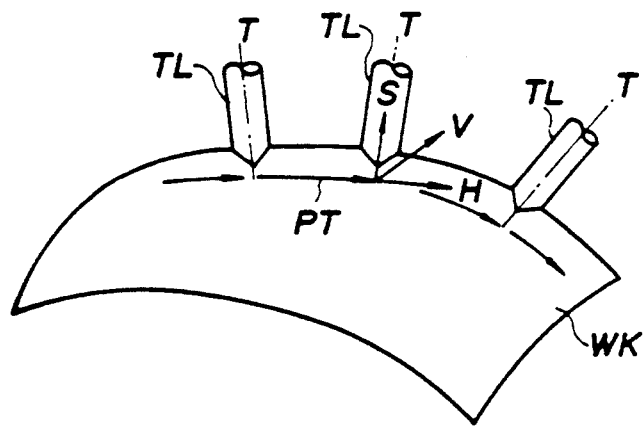
Figure 3:
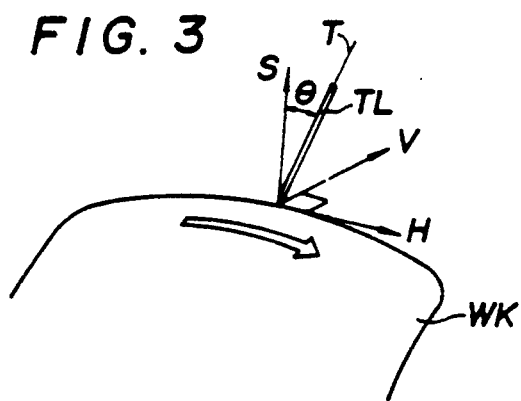

Reference will now be had to FIGS. 2, 3 and 4 to describe the values which the constraints $\alpha$, $\beta$, $\gamma$ assume depending upon the task executed by the robot.

(A) Painting

In a painting operation, the central axis T of the tool (a paint spray nozzle) TL is constantly controlled so as to be directed along the normal line to the workpiece WK (painted surface), as illustrated in FIG. 2. Therefore, we have $$\alpha = \beta = 0$$

Since the shape of the paint spray nozzle has point symmetry in relation to the center of the nozzle, there is no change in the state of the nozzle with respect to the workpiece even if the nozzle is rotated about the central axis of the tool. Accordingly, $\gamma$ may be any angle. In other words, $\gamma$ need not be taken into consideration (in which case the constraint $\gamma$ will referred to as being arbitrary).

(B) Arc welding and sealing

In arc welding and sealing operations, we will have $$\alpha = -\theta, \beta = 0$$

where these operations are performed with the central axis T of the tool (torch) TL tilted clockwise at all times in the VS plane through an angle of $\theta°$ with respect to the normal vector S to the workpiece WK (the surface being welded or sealed), as shown in FIG. 3. Since the shape of the tool tip has point symmetry in relation to the center of the tool, there is no change in the state of the tool with respect to the workpiece even if the tool is rotated about its central axis. Accordingly, $\gamma$ is arbitrary.

(C) Spot welding

Figure 4A:
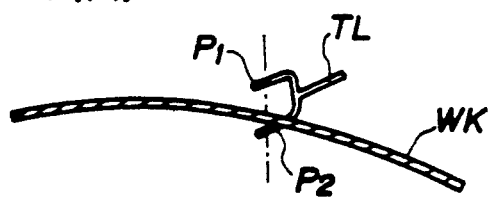
FIGS. 4(a) and 4(b) are views for describing the constraints in a spot welding operation.
Figure 4B:
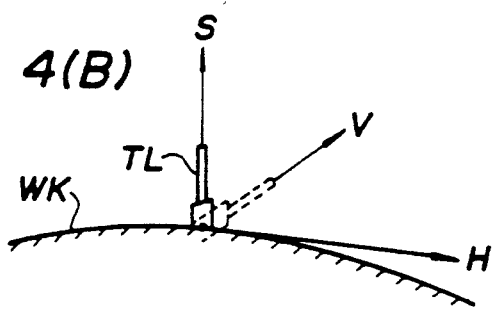

In a spot welding operation, the workpiece WK is placed in a bifurcated portion at the tip of the tool TL and control is so executed that a straight line connecting electrodes $P_1$, $P_2$ of the bifurcated portion is directed along the normal line to the workpiece at all times, as shown in FIG. 4(A). Assume that the tool TL is in the state (initially set state) indicated by the solid line in FIG. 4(B) when $\alpha=\beta=\gamma=0$ holds. In such case, the constraints should be $$\alpha = -90°, \beta = 0, \gamma = 0$$

to attain the attitude shown by the dotted line in FIG. 4(B), namely the attitude illustrated in FIG. 4(A).

The universal robot control axis position data X, Y, Z, $\alpha$, $\beta$, $\gamma$ obtained above are converted into robot position data based on the type of robot used and the dimensions thereof (the dimensions and arrangement of each robot axis).

Figure 5:
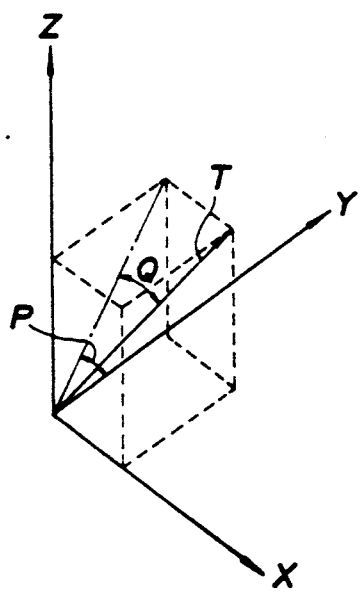
FIG. 5 is a view for describing tool direction data P, Q, R in a workpiece coordinate system.

First, the constraints $\alpha$, $\beta$, $\gamma$ are converted into direction data P, Q, R in the workpiece coordinate system. With reference to FIG. 5, the meanings of P, Q and R in the workpiece coordinate system are as follows: By rotating the central axis T of tool TL $P^o$ about the X axis in the advancing direction of a right-hand screw starting from the $+Y$ axis (from a state in which the T is in coincidence with the Y axis), then rotating the axis T $Q°$ at this position about the Y axis in the advancing direction of a right-hand screw, and finally rotating the axis T $R^o$ in this state about the tool central axis, the tool will assume a state decided by (P, Q, R) at the tool tip position X, Y, Z). The transformation equations for transforming the constraints $\alpha$, $\beta$, $\gamma$ into P, Q, R will now be described. We shall assume that a coordinate system $H_i$-$V_i$-$S_i$ (referred to as an "initially set coordinate system") for the initial state of the tool (see FIG. 6) is known, and that the coordinates (X, Y, Z) of a positioning point $P_1$ in the workpiece coordinate system X-Y-Z, a normal vector (i, j, k) at the point $P_1$, and the constraints ($\alpha$, $\beta$, $\gamma$) also are known, where a tool advance vector is presented by $\vec{H}_i$ (first axial direction), a tool axis vector by $\vec{S}_i$ (third axial direction), and the outer product of $\vec{H}_i$ and $\vec{S}_i$ ($\vec{H}_i * \vec{S}_i$) by $\vec{V}_i$ (second axial direction).

Figure 6:
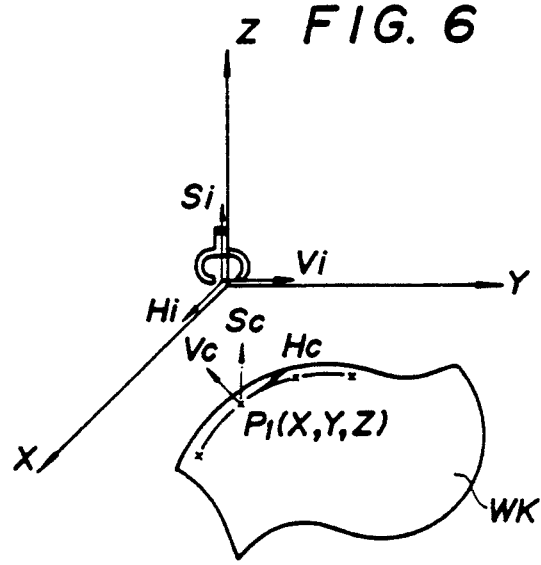

(a) First, an HVS coordinate system is created at the present point $P_1$. Let this coordinate system be represented by $H_c$-$V_c$-$S_c$ (FIG. 6). Note that a vector $\vec{S}_c$ is the tool axis vector obtained when the tool axis is made to coincide with the direction of the normal vector (i, j, k) at the present point $P_1$, $\vec{H}_c$ is the tool advance vector at the point $P_1$, and $\vec{V}_c$ the outer product ($\vec{H}_c * \vec{S}_c$) of the vectors $\vec{H}_c$ and $\vec{S}_c$.

Figure 7:
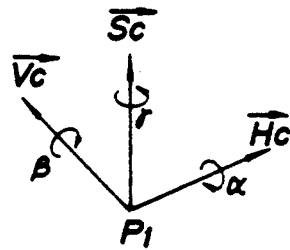

(b) Next, the HVS coordinate system is obtained upon being rotated by the constraints ($\alpha$, $\beta$, $\gamma$). Let this coordinate system be represented by $H\gamma\beta\alpha$-$V\gamma\beta\alpha$-$S\gamma\beta\alpha$. Note that the constraints ($\alpha$, $\beta$, $\gamma$) control axis rotation of the kind shown in FIG. 7.

Axial vectors $\vec{V}_1'$, $\vec{V}_2'$, $\vec{V}_3'$ obtained when one axial vector, e.g. a third axial vector $\vec{V}_3$ among three orthogonal unit vectors $\vec{V}_1$, $\vec{V}_2$, $\vec{V}_3$ is rotated by $\theta$ are as follows:

$$\vec{V}_1' = \cos\theta \times \vec{V}_1 + \sin\theta \times \vec{V}_2 \quad (1)$$

$$\vec{V}_3' = \vec{V}_3 \quad (2)$$

$$\vec{V}_2' = \vec{V}_3 * \vec{V}_1 \quad (3)$$

Note that * signifies an outer product. Accordingly, the HVS coordinate system ($H\gamma\beta\alpha$-$V\gamma\beta\alpha$-$S\gamma\beta\alpha$) resulting from $\alpha$, $\beta$, $\gamma$ rotation in the following order is obtained by using Eqs. (1)-(3): First, a new coordinate system $H\gamma$-$V\gamma$-$S\gamma$ which results when the $S_c$ axis is rotated by $\gamma$ is obtained from Eqs. (1)-(3), where $$\theta = \gamma$$
$$\vec{V}_1 = \vec{H}_c$$
$$\vec{V}_2 = \vec{V}_c$$
$$\vec{V}_3 = \vec{S}_c$$

Next, a new coordinate system $H\gamma\alpha$-$V\gamma\alpha$-$S\gamma\alpha$ which results when the $H\gamma$ axis is rotated by $\alpha$ is obtained from Eqs. (1)-(3), where $$\theta = \alpha$$
$$\vec{V}_1 = \vec{V}\gamma$$
$$\vec{V}_2 = \vec{S}\gamma$$
$$\vec{V}_3 = \vec{H}\gamma$$

Finally, a new coordinate system $H\gamma\alpha\beta$-$V\gamma\alpha\beta$-$S\gamma\alpha\beta$ which results when the $V\gamma\alpha$ axis is rotated by $\beta$ is obtained from Eqs. (1)-(3), where $$\theta = \gamma$$
$$\vec{V}_a = \vec{S}\gamma\alpha$$
$$\vec{V}_2 = \vec{H}\gamma\alpha$$
$$\vec{V}_3 = \vec{V}\gamma\alpha$$

Note that $S\gamma\alpha\beta$ is a tool axis vector ($i_t$, $j_t$, $k_t$) at the positioning point $P_1$, and that $\vec{S\gamma\alpha\beta} = \vec{S}_c$ when the constraints are (0, 0, 0).

(c) Next, the $H\gamma\alpha\beta$-$V\gamma\alpha\beta$-$S\gamma\alpha\beta$ coordinate system obtained at step (b) is transformed into a coordinate system based on an initial setting by using the following formula:

$$\begin{pmatrix} \vec{H'} \\ \vec{V'} \\ \vec{S'} \\ 1 \end{pmatrix} = \begin{pmatrix} \vec{H}\gamma\alpha\beta \\ \vec{V}\gamma\alpha\beta \\ \vec{S}\gamma\alpha\beta \\ 1 \end{pmatrix} \times \begin{pmatrix} & & & 0 \\ & M & & 0 \\ & & & 0 \\ 0 & 0 & 0 & 1 \end{pmatrix} \quad (4)$$

The matrix M depends upon the initial state of the tool. FIG. 8 is a view illustrating the relationship between the initial state of the tool in the HVS coordinate system and the matrix M. Where the initial state is as shown in FIG. 6, the matrix is that of case 2 in FIG. 8.

(d) Thereafter, a matrix N is found for bringing the vector $\vec{S}_i$ into coincidence with $\vec{S'}$. The matrix N is obtained as set forth hereinbelow.

Figure 9:
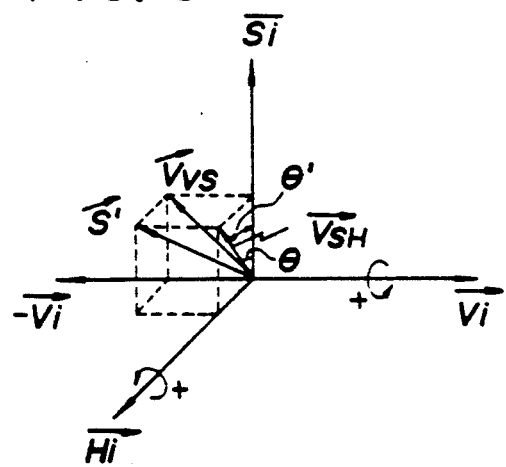

Let $\vec{V}_{VS}$ represent a vector obtained by projecting the vector $\vec{S'}$ onto the $S_i$-$V_i$ plane, and let $\vec{V}_{SH}$ represent a vector obtained by projecting the vector $\vec{S'}$ onto the $S_i$-$H_i$ plane, as shown in FIG. 9. An angle $\theta$ defined by vectors $\vec{S}_i$ and $\vec{V}_{VS}$ may then be obtained in accordance with the following equation:

$$\theta = \tan^{-1}(|\vec{S}_i * \vec{V}_{VS}| / \vec{S}_i \cdot \vec{V}_{VS}) \quad (5)$$

where $\cdot$ signifies an inner product, and $|\ |$ signifies absolute value. $\vec{V}_{VS}$ is a normalized vector. Further, since Eq. (5) can be evaluated only when $0 \leq \theta \leq \pi$ holds, $0 \leq \theta \leq \pi$ shall hold when the inner products $\vec{S_i} * (-\vec{V_i})$ and $\vec{S_i} * \vec{V}_{VS}$ are positive (same direction) and $-\pi < \theta \leq 0$ shall hold when these inner products are negative (opposite direction).

A matrix $N_1$ for effecting rotation about the first axis ($H_i$ axis) by the angle $\theta$ is given by the equation $$N_1 = \begin{pmatrix} 1 & 0 & 0 \\ 0 & \cos\theta & -\sin\theta \\ 0 & \sin\theta & \cos\theta \end{pmatrix} \quad (6)$$

Similarly, if the angle defined by the vector $\vec{S_i}$ and the vector $\vec{V}_{SH}$ is $\theta'$, a matrix $N_2$ for effecting rotation about the second axis ($V_i$ axis) by the angle $\theta'$ is given by the equation $$N_2 = \begin{pmatrix} \cos\theta' & 0 & \sin\theta' \\ 0 & 1 & 0 \\ -\sin\theta' & 0 & \cos\theta' \end{pmatrix} \quad (7)$$

Therefore, the matrix N for bringing the vector $\vec{S_i}$ into coincidence with $\vec{S'}$ is as follows:

$$N = N_1 \times N_2 \quad (8)$$

(e) An H axis vector which results when the vectors $\vec{S_i}$ and $\vec{S'}$ coincide is obtained from the equation $$\vec{H_i'} = \vec{H_i} \times N \quad (9)$$

(f) If the angle defined by the vector $\vec{H'}$ and the vector $\vec{H_i'}$ is obtained by using Eq. (5), then this angle will be the twist angle R.

(g) When the angle R is obtained from the foregoing, the angles P, Q (FIG. 5) are calculated in accordance with the equation $$\theta = \tan^{-1}(|\vec{S_1} * \vec{S_2}|/\vec{S_1} \cdot \vec{S_2}) \quad (10)$$

using the tool axis vector ($i_t$, $j_t$, $k_t$). The angle P is $\theta$ when $$\vec{S_1} = (0, 1, 0), \vec{S_2} = (0, j_t, k_t)$$

in Eq. (10), and the angle Q is $\theta$ when $$\vec{S_1} = (0, 0, 1), \vec{S_2} = (i_t, 0, k_t)$$

in Eq. (10). The vector $\vec{S_2}$ uses a normalized vector, and $\theta = 0$ holds when $|\vec{S_2}| = 0$.

When P, Q, R are thus obtained, X, Y, Z, P, Q, R are subjected to a coordinate transformation, described below, to generate control axis position data for the robot used.

Figure 10:
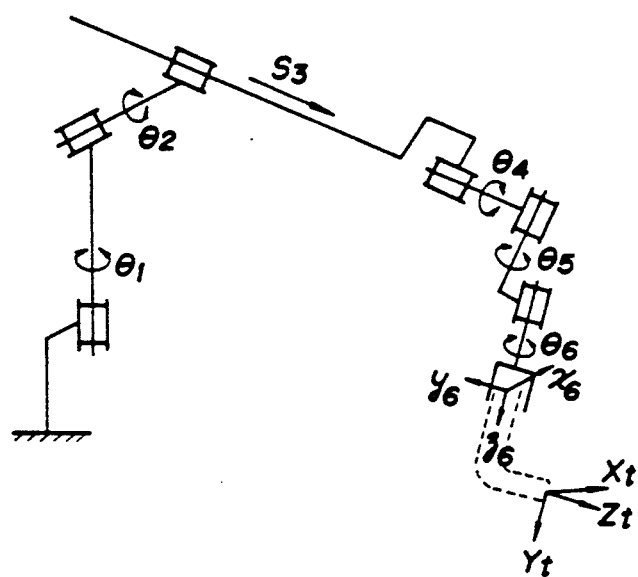
FIGS. 10, 11(a) and 11(b) are views for describing a method of obtaining position data $\theta_1$, $\theta_2$, $\theta_3$, $\theta_4$, $\theta_5$, $\theta_6$ for each axis of a robot from X, Y, Z, P, Q, R in case of a Scheinman arm.

Assume that the robot is a so-called "Scheinman arm" having the six degrees of freedom shown in FIG. 10. In a Scheinman arm, the third degree of freedom is a sliding degree of freedom and the others are rotational degrees of freedom. Let the six link variables be expressed by $\theta_1$, $\theta_2$, $S_3$, $\theta_4$, $\theta_5$ and $\theta_6$. Let the coordinate system (workpiece coordinate system) that is fixed with respect to the floor be expressed by $\Sigma_o$ ($x_o$, $y_o$, $z_o$), and let the coordinate system that is fixed with respect to the hand be expressed by $\Sigma_6$ ($x_6$, $y_6$, $z_6$).

In accordance with the present invention, the position data ($\theta_1$, $\theta_2$, $S_3$, $\theta_4$, $\theta_5$ and $\theta_6$) of the respective robot axes are obtained from the data (X, Y, Z, P, Q, R) by the following three transformations (first, second and third transformations):

$$\begin{pmatrix} X \\ Y \\ Z \\ P \\ Q \\ R \end{pmatrix} \rightarrow \begin{pmatrix} X \\ Y \\ Z \\ \vec{u} \\ \vec{v} \\ \vec{w} \end{pmatrix} \rightarrow \begin{pmatrix} X \\ Y \\ Z \\ \vec{l} \\ \vec{m} \\ \vec{n} \end{pmatrix} \rightarrow \begin{pmatrix} \theta_1 \\ \theta_2 \\ S_3 \\ \theta_4 \\ \theta_5 \\ \theta_6 \end{pmatrix}$$

where the vectors $\vec{u}, \vec{v}, \vec{w}$ are attitude vectors [the three fundamental axes of the tool coordinate system ($X_t$, $Y_t$, $Z_t$)] of the tool attached to the hand, and the vectors $\vec{l}, \vec{m}, \vec{n}$ are the hand attitude vectors [the three fundamental axes of the hand coordinate system ($X_6$, $Y_6$, $Z_6$)].

(a) Since P, Q, R are the angles of rotation about the respective axes, the tool attitude vectors are obtained in accordance with the following equation:

$$\begin{pmatrix} u_x & v_x & w_x \\ u_y & v_y & w_y \\ u_z & v_z & w_z \end{pmatrix} = \begin{pmatrix} 1 & 0 & 0 \\ 0 & C_P & -S_P \\ 0 & S_P & C_P \end{pmatrix} \begin{pmatrix} C_Q & 0 & S_Q \\ 0 & 1 & 0 \\ -S_Q & 0 & C_Q \end{pmatrix} \begin{pmatrix} C_R & -S_R & 0 \\ S_R & C_R & 0 \\ 0 & 0 & 1 \end{pmatrix}$$

$$= \begin{pmatrix} C_Q C_R & -C_Q S_R & S_Q \\ S_P S_Q C_R + C_P S_R & -S_P S_Q S_R + C_P C_R & -S_P C_Q \\ -C_P S_Q C_R + S_P S_R & C_P S_Q S_R + S_P C_R & C_P C_Q \end{pmatrix} \quad (11)$$

The first transformation can be carried out by using Eq. (11). In the above equation, the alphabetic character C signifies the cosine value of the subscripts P, Q, R, and the alphabetic character S signifies the sine value of the subscripts P, Q, R. For example, $C_P$ means cosP, and $S_P$ means sinP.

(b) Matrix for transforming the tool coordinate system into the hand coordinate system Since $\vec{l_o}, \vec{m_o}, \vec{n_o}$, which result when the respective axes attain setting values, can be calculated from setting values entered beforehand (here the metric values of each axis which prevail when the tool coordinate system becomes parallel to the robot coordinate system are entered), an inverse matrix $(T)^{-1}$ is obtained beforehand in accordance with the equation $$(T)^{-1} = (\vec{l_o}, \vec{m_o}, \vec{n_o}) \quad (12)$$

The following will then hold at all times:

$$(\vec{u}, \vec{v}, \vec{w}) = (\vec{l}, \vec{m}, \vec{n}) \times (T)$$

$$(\vec{l}, \vec{m}, \vec{n}) = (\vec{u}, \vec{v}, \vec{w}) \times (T)^{-1} \quad (13)$$

Thus, the second transformation can be carried out in accordance Eq. (13). For the method of obtaining the above matrix T for a Scheinman arm, refer to the publication "bit Extra Edition", July, 1976 issue (Vol. 8, No. 8), pp. 99-102, published by Kyoritsu Shuppan K.K. on Jul. 15, 1976.

(c) If a position vector $\vec{P}$ of the origin $O_6$ of the coordinate system ($x_6$-$y_6$-$z_6$) fixed with respect to the hand of the Scheinman arm shown in FIG. 10 is expressed by $$\vec{P} = \begin{pmatrix} p_x \\ p_y \\ p_z \end{pmatrix}$$

Figure 11A:
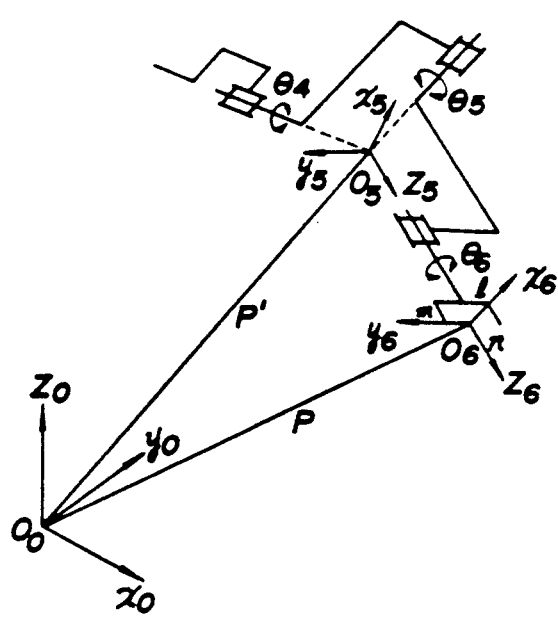
Figure 11B:
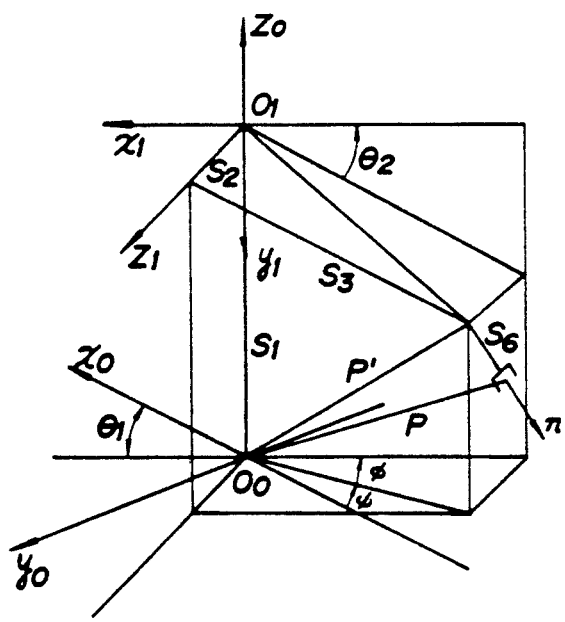

(the vector P is obtained from the tool tip position), then the mechanism of the Scheinman arm is one in which the rotational axes of the three links at the distal end portion pass through one point $O_5$, as shown in FIG. 11(A). Therefore, from the relationships shown in FIG. 11(B), the robot axis position data $\theta_1$, $\theta_2$, $S_3$ are given by the following set of equations:

$$\left.\begin{aligned} \vec{P'} &= \vec{P} - S_6 \cdot \vec{n} \\ S_3 &= \sqrt{\{(p_x')^2 + (p_y')^2 + (p_z' - S_1)^2\} - S_2^2} \\ \theta_1 &= \psi + \phi, \\ \sin\phi &= S_2/\sqrt{(p_x')^2 + (p_y')^2} \\ \tan\psi &= p_y'/p_x', \\ \sin\theta_2 &= (p_z' - S_1)/S_3 \end{aligned}\right\} \quad (14)$$

where $\vec{n}$ is an attitude vector of the second axis of the hand coordinate system obtained from Eq. (13), and $S_1$, $S_2$, $S_6$ are the lengths of the links. Further, the position data $\theta_4$, $\theta_5$, $\theta_6$ of the other robot axes are readily obtained when $\theta_1$, $\theta_2$, $S_3$ are been found. Accordingly, the third transformation can be carried out in accordance with Eq. (14).

Figure 12:
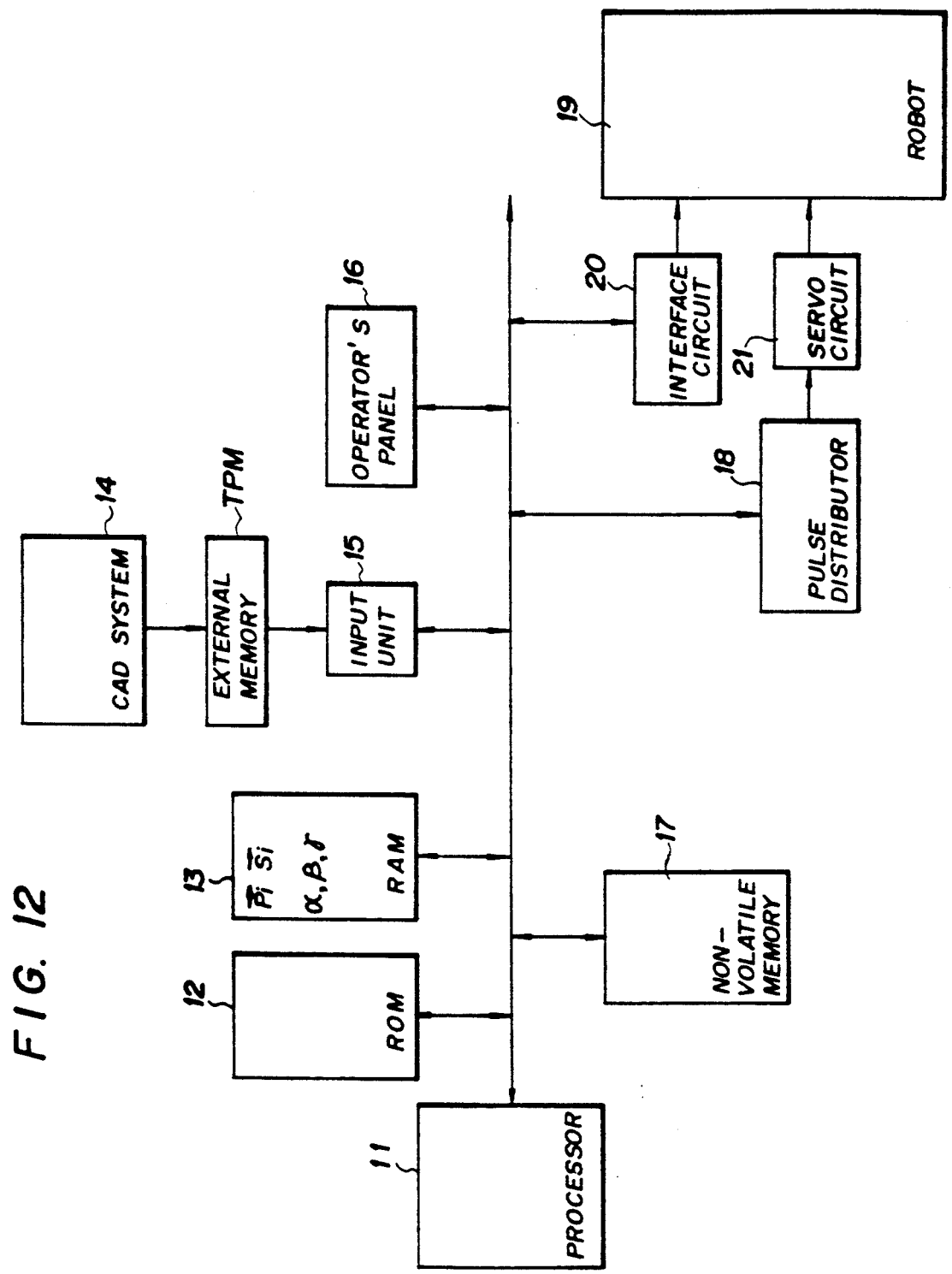
FIG. 12 is a block diagram of an embodiment of the present invention.

FIG. 12 is a block diagram illustrating an embodiment of the present invention. Numeral 11 denotes a processor, 12 a ROM storing a control program, 13 a RAM, and 14 a CAD system which uses the shape of a workpiece and tool path data to calculate and output, offline, the position vector $\vec{P}i$ ($X_i$, $Y_i$, $Z_i$) of discrete tool tip positions on the workpiece along the tool path, as well as the workpiece normal line vector $\vec{S}_i$ at the tool tip positions. Numeral 15 denotes an input unit for inputting the position vector $\vec{P}_i$ and workpiece normal line vector $\vec{S}_i$ created by the CAD system. Numeral 16 designates an operator's panel for inputting, in addition to other data, the constraints (attitude data) based on the type of robot task and the tool tip shape, 17 a non-volatile memory for storing parameters used to convert (X, Y, Z, $\alpha$, $\beta$, $\gamma$) into the position data of the axes constituting the robot under control, 18 a pulse distributor, 19 the robot, 20 an interface circuit for supervising the exchange of data between the processor 11 and the robot 19, and 21 a servo circuit.

Data specifying the shape of the workpiece and data specifying the tool path are inputted to the CAD system 14, the position vector $\vec{P}_i$($X_i$, $Y_i$, $Z_i$) of the discrete tool tip positions on the workpiece along the tool path, and the workpiece normal line vector $\vec{S}_i$ at the tool tip positions are calculated, and these are stored in advance on an external storage medium TPM, such as a floppy disc or magnetic bubble memory.

The data $\vec{P}_i$, $\vec{S}_i$ stored on the external storage medium TPM are successively read out and stored in the RAM 13 by the input unit 15.

The constraints $\alpha$, $\beta$, $\gamma$ are decided by taking into consideration the task (painting, arc welding, sealing, spot welding, etc.) executed by the robot as well as the shape of the tool tip, these constraints are inputted from the operator's panel, and data specifying the initial state of the tool (the $H_i$-$V_i$-$S_i$ coordinate system based on the initial setting) are inputted and stored in the RAM 13.

All of the data specifying the robot control axis positions are stored in the RAM 13 through the foregoing steps.

If a start button (not shown) on the operator's panel 16 is now pressed, the processor 11 successively reads the position vector $\vec{P}_i$, the normal vector $\vec{S}_i$, the constraints $\alpha$, $\beta$, $\gamma$ and the tool initial state data out of the RAM 13, and obtains the position data of each control axis of the robot by executing the calculations of Eqs. (1)–(14) using the parameters stored in the non-volatile memory 17.

Once the position data of each control axis of the robot have been obtained through the foregoing steps, the processor 11 uses these position data to obtain incremental quantities for each axis and then outputs these quantities to the pulse distributor 18. The latter executes a pulse distribution calculation to generate distributed pulses. The servo circuit 21 drives each control axis of the robot in response to these distributed pulses. When each control axis reaches a commanded position, the next position vector and normal line vector are read out of the RAM 13 and the tool is subsequently moved along the commanded tool path as set forth above.

In the case described above, the data ($X_i$, $Y_i$, $Z_i$, $\alpha$, $\beta$, $\gamma$) obtained offline along the tool path are successively fed into the robot control unit, in which these data are converted into the axis data of the robot to be controlled, whereby each axis is controlled. However, it is also possible to adopt an arrangement in which the data ($X_i$, $Y_i$, $Z_i$, $\alpha$, $\beta$, $\gamma$) are converted into the axis data of the robot to be controlled and each axis of the robot is controlled by using the data resulting from the conversion.

Furthermore, the constraints $\alpha$, $\beta$, $\gamma$ are not limited to the case indicated by the embodiment.

In the case described above, the robot control axis position data are obtained from the data (X, Y, Z, P, Q, R) for the Scheinman arm. However, robot control axis position data can be calculated using the data (X, Y, Z, P, Q, R) for robots having other constructions as well. Accordingly, it will suffice if the transformation equations conforming to the robot to be controlled are stored in the robot control unit in advance.

According to the present invention as described above, data specifying the shape of a workpiece and data specifying the attitude of a tool conforming to the task to be executed by a robot are entered, the position (X, Y, Z) of the tool tip in the workpiece coordinate system is calculated by using the data specifying the workpiece shape, the tool attitude data are converted into tool direction data (P, Q, R) in the workpiece coordinate system, and data (X, Y, Z, P, Q, R) comprising the direction data and the data specifying the tool tip position are converted into robot control axis data of the robot to be controlled. As a result, universal robot control axis position data can be created offline and without teaching. In addition, since the tool tip position from among the position data can be calculated automatically by a CAD system, and since the tool attitude is uniquely determined by the task which the robot executes or by the shape of the tool, position data that enable the task to be performed with uniform precision can be created more simply, and without danger, compared to the teaching method.

We claim:

1. A method of generating and storing robot control axis positions and controlling a robot therefrom, said method comprising the steps of:
   a) receiving, input to a CAD system, a workpiece shape and a tool attitude conforming to a task to be executed by a robot and storing the workpiece shape and the tool attitude in a RAM;
   b) calculating, by the CAD system, a tool tip portion in a workpiece coordinate system by using the workpiece shape;
   c) specifying the position of each axis constituting the robot by using the tool tip position and the tool attitude and storing the position of each axis in the RAM;
   d) successively specifying positions of each control axis of the robot along a tool path and storing the positions of each control axis along the tool path in the RAM; and
   e) controlling the robot based on the positions of each control axis of the robot along the tool path stored in the RAM.

2. A method according to claim 1, wherein said step d) comprises the substeps of:
   (d1) receiving, input to the CAD system, the tool path, and
   (d2) successively specifying the positions of each control axis of the robot along the tool path.

3. A method of generating and storing robot control axis positions and controlling a robot therefrom, said method comprising the steps of:
   a) receiving, input to a CAD system, a workpiece shape and a tool attitude conforming to a task to be executed by a robot and storing the workpiece shape and the tool attitude in a memory;
   b) calculating, by the CAD system, a tool tip portion of a tip of the tool in a workpiece coordinate system by using the workpiece shape;
   c) specifying the position of each axis constituting the robot by using the tool tip portion and the tool attitude and storing the position of each axis in a memory;
   d) successively specifying positions of each control axis of the robot along a tool path and storing the positions of each control axis along the tool path in a memory, the positions of each control axis specifying the tool attitude including angles $\alpha$, $\beta$, which indicate deviations of a central axis of the tool from the direction of a workpiece normal line at the tool tip position and a twist angle $\gamma$ indicating an amount of tool tip twist; and
   e) controlling the robot based on the positions of each control axis along the tool path stored in the memory in said step d).

4. A method according to claim 3, further comprising the steps of:
   f) converting the tool attitude into a tool direction data (P, Q, R) in the workpiece coordinate system; and
   g) converting data (X, Y, Z, P, Q, R) comprising the tool direction data and data specifying the tool tip position (X, Y, Z) into position data in a coordinate system of the robot on the basis of the type of robot to be controlled and data specifying dimensions of the robot.

* * * * *

UNITED STATES PATENT AND TRADEMARK OFFICE
CERTIFICATE OF CORRECTION

PATENT NO. : 5,327,057

DATED : July 5, 1994

INVENTOR(S) : Kishi et al.

It is certified that error appears in the above-indentified patent and that said Letters Patent is hereby corrected as shown below:

Col. 3, line 57, "S" should be --$\vec{S}$--;
line 60, "S" should be --$\vec{S}$--.

Col. 6, line 27, "$\gamma$" should be --$\beta$--;
line 29, "a" should be --1--;
line 35, "S$\gamma\alpha\beta$" should be --$\overrightarrow{S\gamma\alpha\beta}$--.

Col. 9, line 8, "P" should be --$\vec{P}$--.

Col. 11, line 8, "portion" should be --position--.

UNITED STATES PATENT AND TRADEMARK OFFICE
CERTIFICATE OF CORRECTION

PATENT NO. : 5,327,057
DATED : July 5, 1994
INVENTOR(S) : Kishi, et al

It is certified that error appears in the above-indentified patent and that said Letters Patent is hereby corrected as shown below:

Col. 12, line 3, "portion" should be --position--;
line 7, "portion" should be --position--.

Signed and Sealed this

Eighteenth Day of October, 1994

Attest:

BRUCE LEHMAN

Attesting Officer        Commissioner of Patents and Trademarks